United States Patent
Benc

(10) Patent No.: US 10,411,966 B2
(45) Date of Patent: Sep. 10, 2019

(54) HOST NETWORK ANALYZER

(71) Applicant: Red Hat, Inc., Raleigh, NC (US)

(72) Inventor: Jiri Benc, Prague (CZ)

(73) Assignee: Red Hat, Inc., Raleigh, NC (US)

( * ) Notice: Subject to any disclaimer, the term of this patent is extended or adjusted under 35 U.S.C. 154(b) by 424 days.

(21) Appl. No.: 14/632,876

(22) Filed: Feb. 26, 2015

(65) Prior Publication Data

US 2016/0254964 A1 Sep. 1, 2016

(51) Int. Cl.
*G06F 15/173* (2006.01)
*H04L 12/24* (2006.01)

(52) U.S. Cl.
CPC .......... *H04L 41/12* (2013.01); *H04L 41/0853* (2013.01)

(58) Field of Classification Search
CPC ............................ H04L 41/12; H04L 41/0853
See application file for complete search history.

(56) References Cited

U.S. PATENT DOCUMENTS

| | | | |
|---|---|---|---|
| 5,295,244 A | 3/1994 | Dev et al. | |
| 7,224,362 B2 | 5/2007 | Kincaid et al. | |
| 7,292,246 B2 | 11/2007 | Goldschmidt | |
| 7,675,862 B2 | 3/2010 | Pham et al. | |
| 7,818,673 B2 | 10/2010 | Cunningham et al. | |
| 8,560,671 B1* | 10/2013 | Yahalom | H04L 67/1097 709/224 |
| 8,943,154 B1* | 1/2015 | Bodell | H04L 41/0604 709/206 |
| 2003/0110242 A1* | 6/2003 | Brown | H04L 29/06 709/222 |
| 2003/0204645 A1* | 10/2003 | Sharma | G06F 8/10 719/328 |
| 2003/0212987 A1* | 11/2003 | Demuth | G06F 9/465 717/130 |
| 2007/0233709 A1* | 10/2007 | Abnous | G06F 21/629 |
| 2008/0155537 A1* | 6/2008 | Dinda | G06F 9/4887 718/1 |

(Continued)

FOREIGN PATENT DOCUMENTS

CN 102136946 4/2014

OTHER PUBLICATIONS

Gort, Adam & Gort, James; Survey of Network Visualization Tools; Contractor report; Dec. 2007; 268 pgs.; Defence R&D Canada—Ottawa.

(Continued)

*Primary Examiner* — Suraj M Joshi
*Assistant Examiner* — Jaren Means
(74) *Attorney, Agent, or Firm* — Lowenstein Sandler LLP

(57) ABSTRACT

Systems and method for generating a network configuration model for a host computer system are disclosed. An example method may include querying a host computer system for network configuration data. The method further includes receiving, in response to the querying, the network configuration data including configuration data of network components included by the host computer system and configuration data of connectivity between the network components. At least one of the network components may be represented by a virtual network component. The method also, generates, in view of the network configuration data, a network configuration model.

20 Claims, 5 Drawing Sheets

(56) References Cited

U.S. PATENT DOCUMENTS

| | | | | |
|---|---|---|---|---|
| 2008/0155631 | A1* | 6/2008 | Liwerant | H04M 3/567 |
| | | | | 725/114 |
| 2008/0276269 | A1* | 11/2008 | Miller | G06Q 30/02 |
| | | | | 725/34 |
| 2009/0327903 | A1 | 12/2009 | Smith et al. | |
| 2010/0050179 | A1* | 2/2010 | Mohindra | G06F 9/5044 |
| | | | | 718/104 |
| 2013/0298184 | A1* | 11/2013 | Ermagan | G06F 21/54 |
| | | | | 726/1 |
| 2014/0010109 | A1* | 1/2014 | Himura | H04L 41/12 |
| | | | | 370/254 |
| 2015/0363949 | A1* | 12/2015 | Manohar | H04L 41/145 |
| | | | | 345/441 |

OTHER PUBLICATIONS

Burns, Catherine M. et al.; Ecological Interface Design: A New Approach for Visualizing Network Management; ResearchGate; 45 pgs.; Department of Systems Design Engineering, University of Waterloo, Ontario.

Zschech, Richard, et al.; Computer Network Visualisation; Technical Report; Oct. 27, 2000; 69 pgs.; Department of Computer Science, Adelaide University, South Australia.

Engstrom, Jared; Analyze Network Setup and Hierarchy on a Host and Plot a Diagram Displaying Relations between Network Components; Beacon IP Report; Dec. 15, 2014; 7 pgs.

* cited by examiner

HOST NETWORK ANALYZER

TECHNICAL FIELD

Embodiments of the present invention relate generally to virtualized computer systems and more specifically related to generating a network configuration model for a host virtual machine.

BACKGROUND

Network virtualization may be software-emulated representations of physical network components of physical network infrastructure used to provide corresponding virtual network components to a host computer system. The host computer system may execute a host operating system (OS) to run an application container. A host computer system may also execute a hypervisor to run one or more virtual machines (VM). The host computer system may be used for network virtualization. The host computer system may include both physical and virtual network components to be used for network virtualization. Physical network components may include networking hardware such as routers, bridges, switches, and network interface cards (NICs) used to facilitate the transmission of data in a computer network. Virtual network components may be software-emulated representations of corresponding physical network components.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
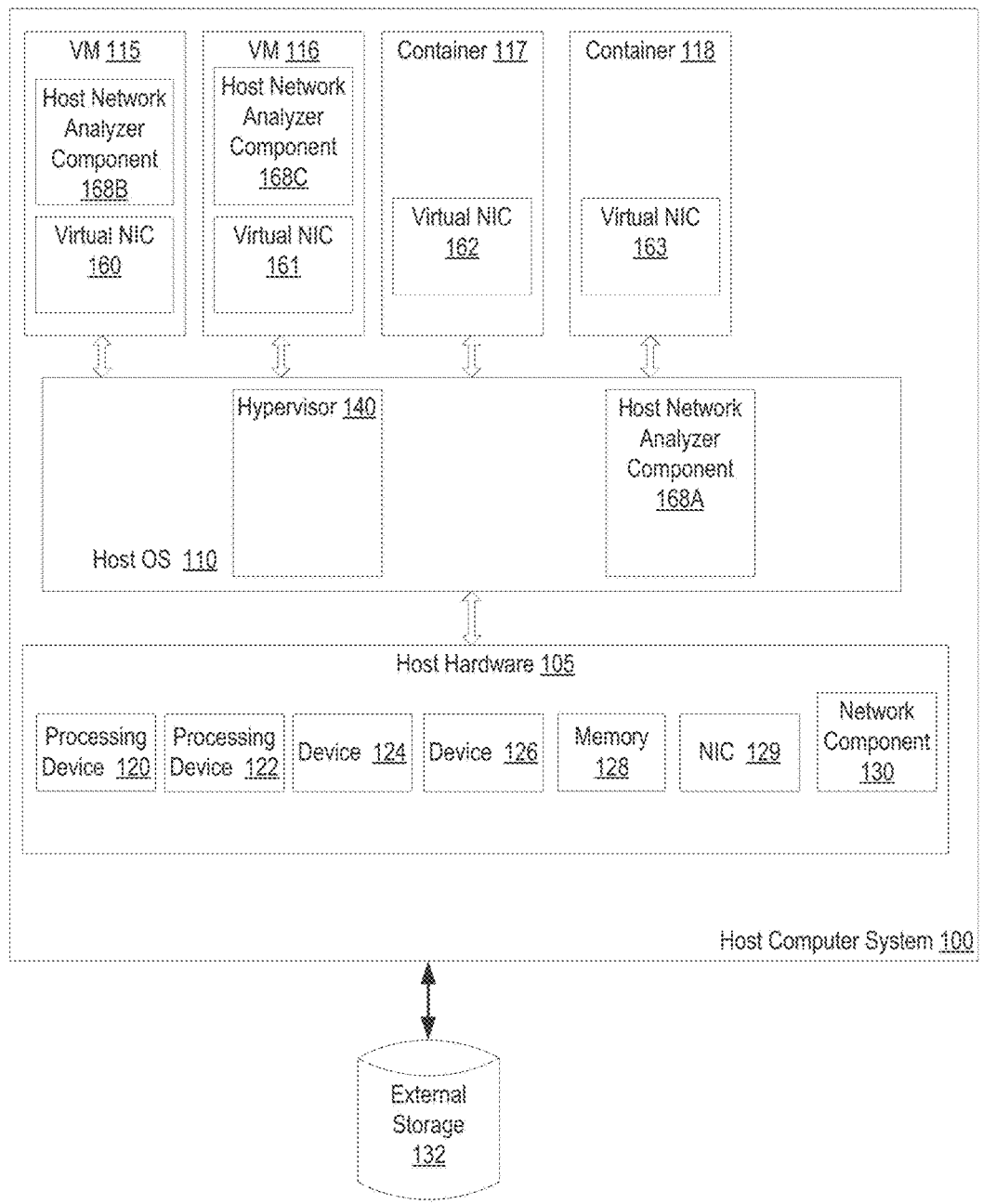
FIG. 1 is a block diagram that illustrates an embodiment of a computer system that hosts one or more application containers, in accordance with one or more implementations of the present disclosure.

Described herein are methods and systems of generating a network configuration model by querying a host computer system for network configuration data of one or more virtual network components.

"Application container" or "container" herein shall refer to a software component providing an interface between a host and a software application. An application container may provide resource isolation for resources (e.g., applications, network components, etc.) associated with the application container. For example, virtual network components associated with an application container may be isolated from other virtual network components associated with another application container and/or virtual machine. The software application may comprise one or more related processes and may provide a certain service (e.g., an HTTP server, a database server, etc.). The host may be represented by a host computer system or by a virtual machine being executed by a host computer system. In the containerized execution model, the software application and its dependencies (such as binaries and/or libraries that as necessary to run the application) run within the application container, which is an isolated process in the user space of the host operating system, sharing the kernel with other containers. An application container may be run directly on the host OS and may be run without a hypervisor. Application container may refer to an application container and/or a virtual machine. A virtual machine may be a type of application container.

A "virtual machine" (also may be referred to as "VM") may be a software-emulated representation of a physical machine, such as a computer system. A virtual machine may be run by a hypervisor executed by a host computer system.

"Network configuration data" herein shall refer to parameters and values of the parameters describing the network components included by a host computer system and describing the connectivity between the network components. The network configuration data may include configuration data of one or more virtual network components.

"Connectivity" herein shall refer to a path of a network frame between at least two Open Systems Interconnection (OSI) data link layer (layer 2) network components or a path of a data packet between at least two OSI network layer (layer 3) network components. The OSI model may be a conceptual model that characterizes and standardizes the internal functions of a communication system, such as host computer system 100, by partition the communication system into abstract layers (i.e., layers 1-7). The data link layer (layer 2) may be the protocol layer that transfers data between adjacent network nodes and may be responsible for access control, flow control, and error checking. Examples of data link protocols may be Ethernet, Point-to-Point Protocol, High-Level and Data Link Control, among others. A path of a network frame between two OSI data link layer network components may, for example, be the path of a frame from one virtual Ethernet interface of a VM to another virtual Ethernet interface of another VM (e.g., a virtual Ethernet interface pair). The network layer (layer 3) may provide functional and procedural rules of transferring data sequences from a source to a destination node and may be responsible for packet forwarding. Internet Protocol and IP addresses may be part of the network layer. A path of a data packet between two OSI network layer network components may, for example, be the path of a data packet from one virtual router to another virtual router.

A "network interface card" (also may be referred to as "network interface controller" or "NIC") herein shall refer to a computer hardware component that connects a computer system to a computer network. A NIC may operate on both the physical and data link layers of a computer system and allow network connectivity. A host computer system may have one or more NICs. One or more virtual NICs may be logically connected to one physical NIC. Each NIC may be associated with a unique media access control (MAC) address.

A "virtual network interface card" (also referred to as "virtual network interface controller" or "vNIC") herein shall refer to a software-emulated representation of a physical NIC that may act as a physical NIC for an application container and/or virtual machine. An application container and/or VM with a network interface may have a vNIC associated with a unique MAC address.

A "virtual network" (also referred to as "network virtualization") herein may refer to a software-emulated representation of one or more physical network components.

A "virtual network segment" herein may refer to a software-emulated representation of a physical network segment (e.g., a LAN segment).

A "network configuration model" herein may refer to a representation or mathematical structures describing relationships between objects, such as network components. One example of a network configuration model may be a graph including a finite set of nodes at least some of which are connected by edges. In one example, the nodes may represent network components of a host computer system, while the edges may represent the connectivity between network components modeled as edges.

In accordance with one or more implementations of the present disclosure, a host network analyzer component may be a software application implementing one or more features of the systems and methods of the present disclosure. In one implementation, a host network analyzer component may query a host computer system for network configuration data. Querying for network configuration data may include querying the host machine to find the containers and/or VMs associated with the host machine. Host network analyzer component may query certain application containers and/or VMs to discover the network components associated with such an application container and/or VM. One or more of the network components may be virtual network components. To discover the network components, the host network analyzer component may query at least one of the host OS (e.g., kernel of the host OS), guest OS (e.g., kernel of the guest OS) of a VM, or the hypervisor. In some cases, to discover additional network components the host network analyzer component may query applications (e.g., daemons) using application programming interface (API) calls. For each network component associated with the containers and/or VMs (and/or for each network component associated with a virtual network e.g., all network components associated with the host computer system), the host network analyzer component may determine the connectivity between the network components. To determine the connectivity, host network analyzer component may query at least one of the host OS, guest OS of a VM, or hypervisor. To determine additional connectivity between network components, host network analyzer component may query applications (e.g., daemons) operating in user space (or split between user and the kernel) using API calls. The network configuration data for the network components and the connectivity between the network components may be used to generate a network configuration model describing the network configuration of the host computer system.

Various aspects of the above referenced methods and systems are described in details herein below by way of examples, rather than by way of limitation.

FIG. 1 is a block diagram that illustrates an embodiment of a computer system (referred to herein as a host computer system 100) that hosts one or more application containers (VM 115-116, Container 117-118). The host computer system 100 may be a rackmount server, a workstation, a desktop computer, a notebook computer, a tablet computer, a mobile phone, a palm-sized computing device, a personal digital assistant (PDA), etc. The host computer system 100 includes host hardware 105, which may include multiple processing devices 120, 122, multiple devices 124, 126, memory 128, physical network interface controllers (NICs) 129, network components 130, and other hardware components. The memory 128 may include volatile memory devices (e.g., random access memory (RAM)), non-volatile memory devices (e.g., flash memory), and/or other types of memory devices. The host hardware 105 may also be coupled to external storage 132 via a direct connection or a local network. The host computer system 100 may be a single machine or multiple host computer systems arranged in a cluster.

Network component 130 may be a single network device or multiple network devices. Examples of network devices include ports, bridges (which may consist of multiple ports), tunnels, switches, routers, and other physical network devices.

Each of the devices 124, 126 may be a physical device that is internal or external to the host computer system 100. Examples of internal devices include a graphics card, hardware RAID controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc.

The NIC 129 may be a single NIC or may be multiple NICs. NIC 129 may be Ethernet controllers, Wi-Fi controllers, Token Rings, and so forth. The NICs 129 provide functionality to communicate over a network using specific physical layer (OSI layer 1) and data link layer (OSI layer 2) standards (e.g., Ethernet, Wi-Fi, Token Ring, etc.).

The host computer system 100 includes a hypervisor 140 (also known as a virtual machine monitor (VMM)). In one embodiment (as shown) hypervisor 140 is a component of a host operating system (OS) 110. Alternatively, the hypervisor 140 may run on top of a host OS 110, or may run directly on host hardware 105 without the use of a host OS 110.

The hypervisor 140 may manage system resources, including access to memory 128, devices 124, 126, NICs 129, secondary storage, and so on. Alternatively, hypervisor 140 may rely on the host OS 110 to manage the system resources. The hypervisor 140, though typically implemented in software, may emulate and export a bare machine interface (host hardware 105) to higher level software. Such higher level software may comprise a standard or real-time operating system (OS), may be a highly stripped down operating environment with limited operating system functionality, may not include traditional OS facilities, etc. The hypervisor 140 presents to other software (i.e., "guest" software) the abstraction of one or more virtual machines (VMs) 115-116, which may provide the same or different abstractions to various guest software (e.g., guest operating system, guest applications, etc.).

Application containers 117-118 may run directly on a host OS 110 without a using a hypervisor. The containers may share the host OS and underlying physical resources. Network configuration data for a container 117-118 may be obtained by querying the host OS using system calls defined by, for example, an application binary interface (ABI). An ABI may define a system call interface allowing user space programs, such as software applications operating in containers 117-118, to execute kernel-level functions of the host OS 110. Numerous system calls are typically available to the user space program via the ABI. A system call may provide a way for an application to request a service from a kernel of host OS 110. In other implementations, an ABI may not be restricted to the kernel.

Network configuration data for network components associated with VMs, such as VM 115-116, may be obtained from the hypervisor and/or the guest OS (e.g., kernel) of the respective VM. The hypervisor may be queried using function calls or API calls to the hypervisor. The guest OS of a VM may be queried using system calls associated with the respective quest operating system.

The host computer system 100 hosts any number of virtual machines (VM) 115-116 (e.g., a single VM, one hundred VMs, etc.) and/or containers 117-118. A virtual machine 115-116 is a combination of guest software that uses an underlying emulation of host computer system 100 (e.g., as provided by hypervisor 140). Each VM 115-116 and/or container 117-118 may include one or multiple virtual components such as virtual processors, virtual memory, virtual devices (e.g., virtual storage), virtual NICs 160-163, and virtual network components such as virtual ports, virtual bridges (which may contain virtual ports), virtual tunnels, and so forth. Each of these virtual components may map to a hardware component, such as a processing device 120, 122, device 124, 126, external storage 132, NIC 129, memory 128, or network component 130. Virtual machines 115-116 may be, for example, hardware emulation, full virtualization, para-virtualization, and operating system-level virtualization virtual machines. The guest software that runs in a VM 115-116 may include a guest operating system, guest applications, guest device drivers, etc. The virtual machines 115-116 may have the same or different guest operating systems, such as Windows®, Linux®, Solaris®, etc.

Some virtual machines 115-116 and/or containers 117-118 may include software that is accessible by clients (e.g., local clients and/or remote clients) to provide services to those clients. For example, VM 115 may include a virtual server such as a virtual web server, a virtual data storage server, a virtual gaming server, a virtual enterprise application server, a virtual voice over internet protocol (VOIP) server, etc. A client may connect to the virtual sever to request one or more services provided by the virtual server.

Similarly, some VMs 115-116 and/or containers 117-118 may include a virtual desktop. A virtual desktop is a virtualized desktop computer, and thus may include storage, an operating system, applications installed on the operating system (e.g., word processing applications, spreadsheet applications, email applications, etc.), and so on. However, rather than these functions being provided and performed at a client, they may instead be provided and performed by VM 115-116 and/or container 117-118. A virtual desktop may represent an output (e.g., an image to be displayed) generated by a desktop application running within a virtual machine. Graphics data associated with the virtual desktop can be captured and transmitted to a client, where the virtual desktop may be rendered by a rendering agent and presented by a client application.

Some virtual machines 115-116 and/or containers 117-118 may include software that performs one or more functions transparently to a virtual server, virtual desktop and/or client. For example, virtual machines 115-116 may include virtual appliances. A virtual appliance may be a virtual machine image file that includes a preconfigured operating system environment and a single application. A virtual appliance may simplify the delivery, setup and operation of that single application. Virtual appliances may be used for deploying network applications, such as firewalls, virtual private networks, wide area network (WAN) optimizers, and so forth.

Host computer system 100 may include host network analyzer component 168A-C. In one implementation host network analyzer component (e.g., host network analyzer component 168A) may be a software application running on host OS 110. In another implementation, host network analyzer component 168A may be a component of host OS 110. In another implementation, host network analyzer component (e.g., host network analyzer component 168B and/or 168C) may be an application installed on a VM or container, such as VM 115-116 and container 117-118. In still another implementation, host network analyzer component may be a software application running outside the host computer system 100, such as at a host controller. Any combination of the aforementioned examples may be implemented. References to host network analyzer component 168A will be made below for purposes of illustration rather than limitation. Host network analyzer components 168B-C may have similar functionality and implementation as described with respect to host network analyzer component 168A, unless otherwise indicated.

In one implementation, host network analyzer component 168A may query a host computer system 100 for network configuration data. The host network analyzer component 168A may query at least one of a host OS 110 (e.g., kernel) using system calls, guest OS (e.g., kernel) of VM 115-116 using system calls, or hypervisor 140 using calls, such as function calls or API calls. It should be noted that in some implementations, host network analyzer component 168A may query the hypervisor 140 or kernel of guest OS for network configuration data in regards to VM 115 and 116 and/or may query the kernel of host OS 110 using system calls for network configuration data in regards to container 117 and 118. In still another implementation, host network analyzer component 168A may communicate with host network analyzer component 168B and/or 168C associated with VM 115 and VM 116, respectively, to gather network configuration data for the respective VMs. Host network analyzer component 168A may communicate with host network analyzer component 168B and/or 168C through hypervisor 140 (e.g., using system calls) and/or through a vNIC (e.g., vNIC 160 and/or 161 and using calls, such as function or API calls to host network analyzer component 168B and/or 168C). Host network analyzer components 168B and/or 168C may gather network configuration data for each of the associated VMs and communicate the network configuration data to host network analyzer component 168A on host OS 110. Host network analyzer component 168A may aggregate the received network configuration data from host network analyzer components 168B and/or 168C (as well as any additional network configuration data) and use the aggregated network configuration data to generate a network configuration model.

As part of querying host computer system 100 for network configuration data, host network analyzer component 168A may query the host computer system 100 to determine the VMs and containers operating on host computer system 100. As described the above, host network analyzer component 168A may query at least one of the host OS 110, guest OS of a VM, or a hypervisor. In response to the query, host network analyzer component 168A may receive an identifier for each container 117 and 118 and VM 115 and 116 operating on host computer system 100.

For each container and VM, host network analyzer component 168A may query the host computer system 100 for configuration data of network components used by each container and/or VM. To query for configuration data of network components, host network analyzer component 168A may query at least one of host OS 110, guest OS, and/or hypervisor 140 to determine the network components included by each container and VM. In some implementations, host network analyzer component 168A may look outside the kernel and/or hypervisor for some or all the configuration data of some or all the network components. In such instances, host network analyzer component 168A may query one or more applications (or daemons) running in user space (or split between running in user space and the kernel) using API calls specific to a particular application. The configuration data for the network component may include parameters and values indicating the type of network component (e.g., vNIC, virtual Ethernet interface, etc.), the version of the network component, the name of the network component, the Internet Protocol (IP) address of the network component, the MAC address of the network component, the netmask associated with the network component, the default gateway associated with the network component, state of the network component (e.g., administratively enabled or disabled, link detected, promiscuous mode, multicast mode enabled, etc.), traffic filter configuration, quality of service (QoS) configuration, routing information associated with a network component, among other configuration information.

In some implementations, one or more of the network components may be a virtual components provided by vNIC associated with a container (e.g., vNIC 160 associated with VM 115 and/or vNIC 162 associated with container 117). For example, the virtual components provided by the vNIC 160 may be a virtual Ethernet interface at VM 115. A virtual component may also be provided by a virtual network segment associated with the vNIC such as a virtual switch at host OS 110 sending data to one or more vNICs 160-163.

For each network component of a VM and/or container, host network analyzer component 168A may query the host computer system 100 for configuration data describing the connectivity between network components. To query for connectivity configuration data, host network analyzer component 168A may query at least one of the host OS 110 (e.g., kernel), guest OS (e.g., kernel) of the VM, or the hypervisor 140. In some implementations, host network analyzer component 168A may look outside the kernel and/or hypervisor for some or all the configuration data of some or all the network components. In such instances, host network analyzer component 168A may query one or more applications (or daemons) running in user space (or split between running in user space and the kernel) using API calls specific to a particular application. In one example, if host network analyzer component 168A knows the type of network component identified from configuration data, host network analyzer component 168A may employ a module for the specific type of network component. The module may execute a series of instructions and query a combination of kernel, hypervisor, and/or application for the specific type of network component to determine configuration data indicating the connectivity of the network component. The configuration data for the connectivity may include parameters and values indicating a path of a network frame between at least two OSI data link layer (layer 2) network components, path of a data packet between at least two OSI network layer (layer 3) network components, the destination network component for a frame, the origin network component of a frame, whether or not the network component changes the header of a frame (e.g., add a VLAN tag) upon sending the frame, among other information. The configuration data for the connectivity may further include parameters and values indicating that the connectivity between two network components is conditional. Conditional connectivity may refer to a path a network frame and/or data packet may take if certain conditions (e.g., based on network frame header and/or data packet header and/or network frame content and/or data packet content) are fulfilled. For example, only a data packet with a certain VLAN ID may be received through a particular path. It should be noted that conditions may not be symmetric for transmission and reception.

It should also be noted that host network analyzer component 168A may determine the connectivity between network components associated with host computer system 100 (e.g., not only for network components associated with containers and/or VMs). The host network analyzer component 168A may query the hypervisor 140 (or another application) to determine configuration data of the network components associated with host computer system 100, in a similar manner as described herein. Also in a similar manner as described herein, host network analyzer component 168A may determine configuration data of the connectivity between the network components associated with host computer system 100. For example, a host computer system 100 may be associated with a complex topology of interconnected bridges (e.g., virtual bridges and/or physical bridges). Host network analyzer component 168A may determine the bridges associated with host computer system 100 and not only determine the connectivity between, for example a virtual network component associated with a VM and the bridge, but also determine the connectivity between the multiple bridges themselves.

The network configuration data may be used to generate a network configuration model for host computer system 100. In one example, network components may be represented by nodes of a graph and the connectivity between network components represented by edges of a graph. The network configuration model may be of all or part of the network components included by the host computer system 100.

In one implementation, the network configuration model may reflect a data link layer (layer 2) and/or a network layer (layer 3) of the Open Systems Interconnection (OSI) model.

In another implementation, the network configuration model may reflect one or more of the 7 layers of the OSI model. For example, the network configuration model may include the application layer (layer 7). The application layer may specify shared protocols and interface methods used by hosts in a network. The network configuration model may include, for example, a web browser with a proxy, as a node.

The network configuration model may be used for various purposes. In one implementation, the network configuration model may be used to generate a graphical representation of the network configuration for host computer system 100. The graphical representation may be displayed on a user device, such as client machine. An example of a graphical representation of the network configuration model of a host computer system is provided in FIG. 2.

In another implementation, the network configuration model may be used to simulate network traffic on the host computer system. Network traffic may include multiple frames (e.g., layer 2). It should be noted the description of the data link layer (layer 2) is used for purposes of illustration and not limitation. Descriptions of network traffic (e.g., data packets of layer 3), or other features described herein, may use elements of other layers of the OSI model. In one implementation, simulating network traffic may include a user providing input. For example, using a user interface a user may input a data packet (e.g., of a particular type) at a particular node. The network configuration model may be used to determine which path and/or paths the data packet may take, which nodes the data packet will visit, and/or how the data packet may be modified at each node along the path (e.g., adding a VLAN tag at a VLAN networking component). A data packet may take multiple paths, and each path may be simulated and the results reported. The result may be displayed as a chain of nodes and edges (e.g., indicating a path) and/or graphically (e.g., such as depicted with reference to FIG. 2). The simulation may be based on the network configuration model and performed without sending an actual data packet on host computer system 100. The simulation may be performed on a different computer system (or same) from which the network configuration data was gathered (e.g., by saving the network configuration model to a file and transporting the file to a different computer system).

In still another implementation, the network configuration model may be used to analyze the network configuration on the host computer system. Analyzing the network configuration on the host computer system may include analyzing the type of network frames and/or data packets that may pass between two nodes of the network configuration model. Analyzing the network configuration may also include analyzing the average maximum rate at which network frames and/or data packets may be sent between two nodes. The analysis may be based on the network configuration model and performed without sending an actual data packet or network frame on host computer system 100. The analysis may be performed on a different computer system (or same) from which the network configuration data was gathered (e.g., by saving the network configuration model to a file and transporting the file to a different computer system).

Figure 2:
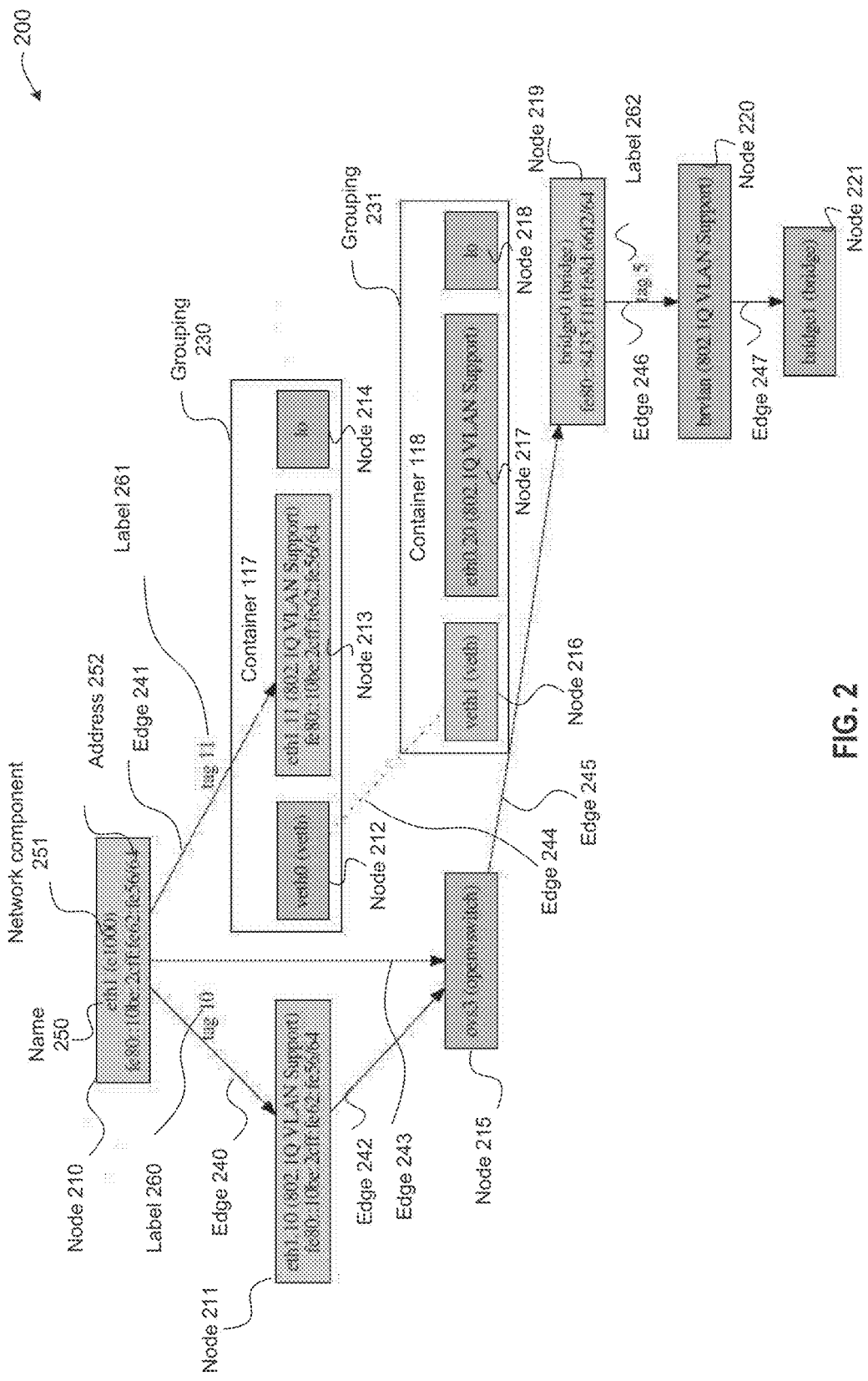
FIG. 2 is an illustration of a graphical. representation of a network configuration model, in accordance with some implementations of the present disclosure.

FIG. 2 is an illustration of a graphical. representation 200 of a network configuration model, in accordance with some implementations of the present disclosure. Graphical representation 200 includes nodes 210-221. Each node represents a network component of host computer system 100. Each node may contain additional information, such a configuration data, for the respective network component. For example, node 210 includes the name of the network component (i.e., name 250), the type of network component (i.e., network component 251 indicates a physical NIC), an address 252 (e.g., IP address, MAC address, etc.). Each node may convey additional configuration data by, for example, using colors. A node colored green may indicate that the respective network component is enabled and a node colored grey may indicate that the respective network component is disabled (e.g., disabled by an administrator).

Graphical representation 200 also includes edges 240-247. An edge may represent configuration data of the connectivity between two network components. Edges may be dashed to show a possible network traffic flow between two network components (e.g., edge 244) disabled by, for example an administrator. An edge may have a label, such as label 260-262 identifying a destination network component for a frame. Edges with labels (e.g., edge 240 and edge 241) may indicate that only frames of a particular type may be sent between the two network components. Edges without a traffic label (e.g., edge 242 and 243) may indicate that frames of any particular type may be sent between two network components.

Nodes may be logically grouped. For example, grouping 230 includes all the network components (e.g., nodes 212-214) of container 117 of FIG. 1, and grouping 231 contains all the network components (e.g., nodes 216-218) of container 118 of FIG. 1.

Figure 3:
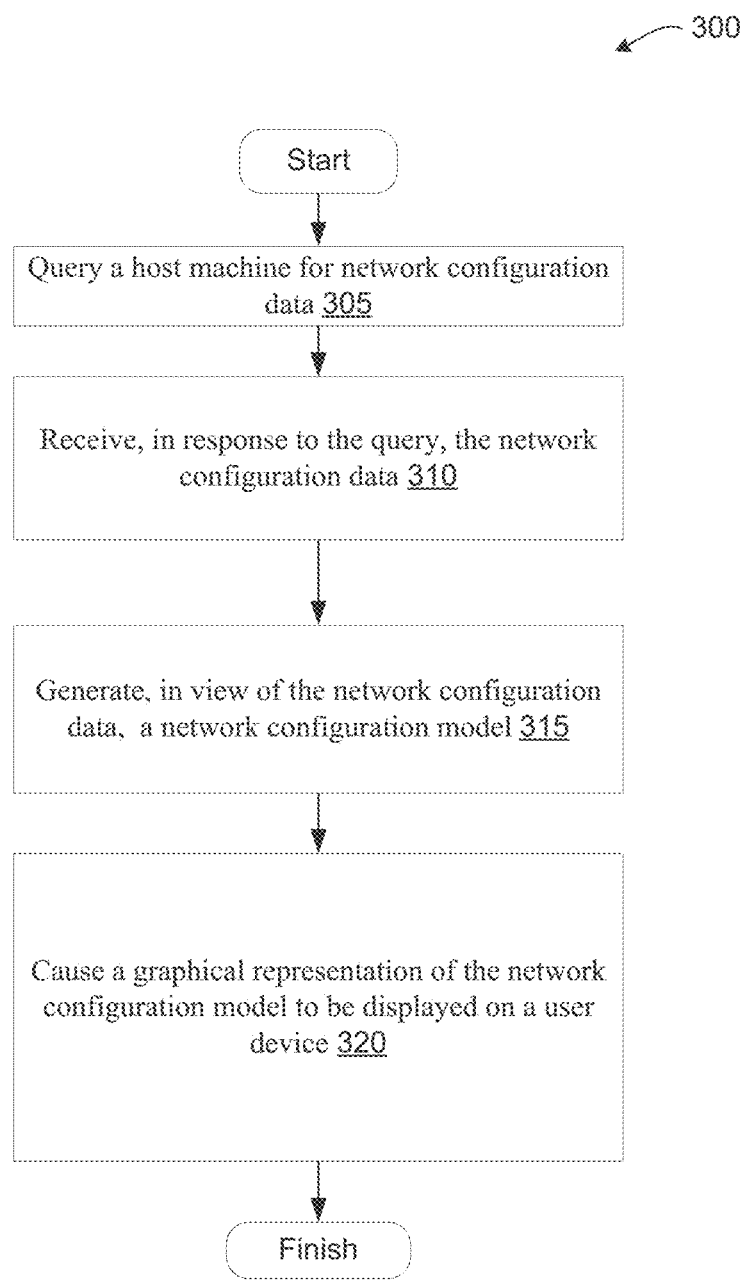
FIG. 3 is a flow diagram illustrating a method of generating a network configuration model of a host computer system, in accordance with some implementations of the present disclosure.

FIG. 3 is a flow diagram illustrating a method of generating a network configuration model of a host computer system, in accordance with some implementations of the present disclosure. Method 300 may be performed by processing logic that may include hardware (circuitry, dedicated logic, etc.), software (such as is run on a general purpose computer system or a dedicated machine), or a combination of both. In one implementation, the method 300 is performed all or in part by host network analyzer component 168A, 168B, and/or 168C.

In block 305 of method 300 where processing logic implementing the method queries host computer system 100 for network configuration data. Method 300 continues in block 310 where processing logic in response to the query receives the network configuration data. Method 300 continues to block 315 where processing logic generates a network configuration model in view of the network configuration data. Method continues to block 320 where processing logic causes a graphical representation of the network configuration model to be displayed on a user device. Method 300 is further described in reference to FIGS. 1 and 2, above.

Figure 4:
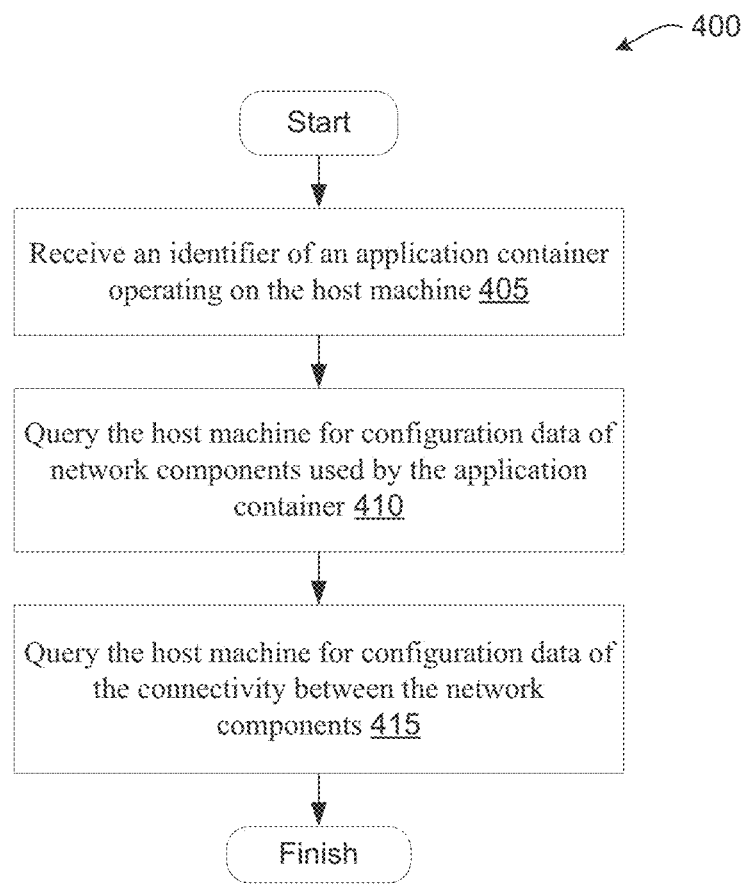
FIG. 4 is a flow diagram illustrating a method of querying for network configuration data of a host computer system, in accordance with some implementations of the present disclosure.

FIG. 4 is a flow diagram illustrating a method of querying for network configuration data of a host computer system, in accordance with some implementations of the present disclosure. Method 400 may be performed by processing logic that may include hardware (circuitry, dedicated logic, etc.), software (such as is run on a general purpose computer system or a dedicated machine), or a combination of both. In one implementation, the method 400 is performed all or in part by host network analyzer component 168A, 168B, and/or 168C.

Method 400 begins at block 405 where processing logic implementing the method receives an identifier of an application container included by the host computer system. Method 400 continues to block 410 where processing logic queries the host computer system for configuration date of the network components used by the application container. Method 400 continues to block 415 where processing logic queries the host computer system for configuration data of the connectivity between the network components. Method 400 is further described in reference to FIGS. 1 and 2, above.

For simplicity of explanation, the methods 300 and 400 are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 5:
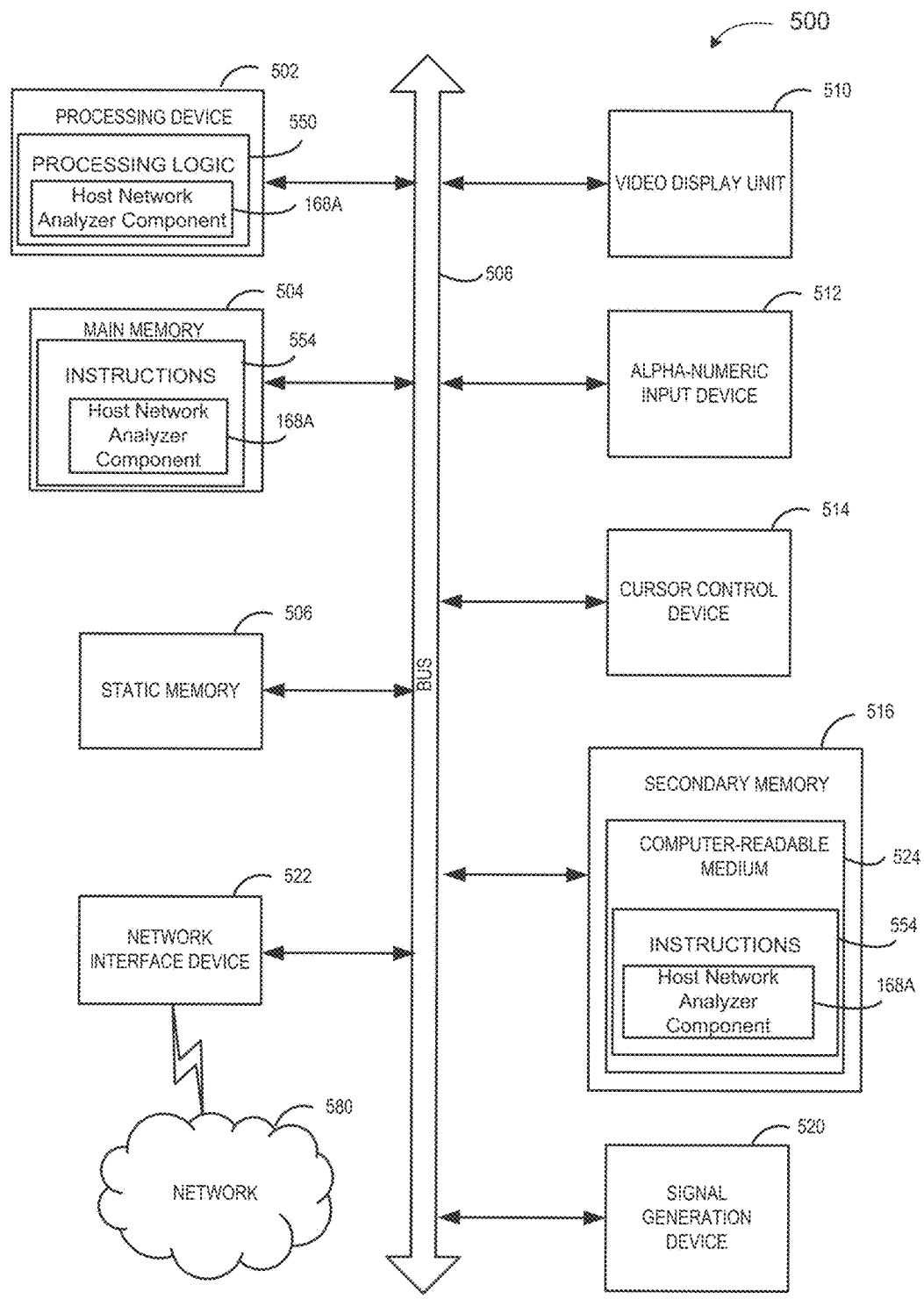
FIG. 5 illustrates a diagrammatic representation of a machine in the exemplary form of a computer system, in accordance with some implementations of the present disclosure.

FIG. 5 illustrates a diagrammatic representation of a machine in the exemplary form of a computer system, in accordance with some implementations of the present disclosure. The computer system 500 (e.g., machine) may correspond to host computer system 100 of FIG. 1. In embodiments of the present invention, the machine may be connected (e.g., networked) via network 580. The machine may be connected other machines via network 580 in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 502 may therefore include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 554 embodying any one or more of the methodologies or functions described herein (e.g., host network analyzer component 168A-C). The instructions 554 may also reside, completely or at least partially, within the main memory 504 and/or within the processing device 502 during execution thereof by the computer system 500; the main memory 504 and the processing device 502 also constituting machine-readable storage media.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "querying", "receiving", "generating", "causing", "simulating", "analyzing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   querying, by a processing device, a host computer system for network configuration data associated with network components within the host computer system, wherein querying the host computer system comprises querying an application container of the host computer system for the network configuration data of one or more of the network components within the application container;
   receiving, in response to the querying, the network configuration data comprising first configuration data of the network components within the host computer system and second configuration data of connectivity between the network components within the host computer system, wherein at least one of the network components is represented by a virtual network component within the application container of the host computer system; and
   generating, in view of the network configuration data, a network configuration model of the network components within the host computer system, wherein the network components within the host computer system are represented by nodes of a graph and the connectivity is represented by edges of the graph, wherein the virtual network component within the application container is represented by a respective node of the network configuration model, and wherein the network configuration model logically groups the one or more of the network components that are within the application container.

2. The method of claim 1, wherein querying the host computer system for network the configuration data associated with network components within the host computer system comprises:
   querying at least one of a host operating system (OS), a guest OS, or a hypervisor for the network configuration data for the virtual network component within the application container.

3. The method of claim 1, wherein the virtual network component is provided by one of a virtual network interface card (vNIC) associated with the application container or a virtual network segment associated with the vNIC.

4. The method of claim 1, further comprising:
   causing a graphical representation of the network configuration model to be displayed on a user device.

5. The method of claim 1, further comprising:
   simulating network traffic on the host computer system using the network configuration model.

6. The method of claim 1, further comprising:
   analyzing a network configuration on the host computer system using the network configuration model.

7. The method of claim 1, wherein querying the host computer system for the network configuration data associated with the network components within the host computer system further comprises:
   receiving an identifier of the application container operating on the host computer system;
   querying the host computer system for the first configuration data of the network components within the application container; and
   querying the host computer system for the second configuration data of the connectivity between the network components within the application container.

8. The method of claim 1, wherein the application container is a virtual machine.

9. The method of claim 1, wherein the network configuration model reflects at least one of a data link layer (layer 2) or a network layer (layer 3) of an Open Systems Interconnection (OSI) model.

10. The method of claim 1, wherein the connectivity represents at least one of: a path of a network frame between at least two Open Systems Interconnection (OSI) data link layer (layer 2) network components or a path of a data packet between at least two OSI network layer (layer 3) network components.

11. A system comprising:
    a memory to store instructions for a host network analyzer component;
    a processing device, coupled with the memory, to execute the instructions; and
    the host network analyzer component, executed by the processing device, to:
    query, by the processing device, a host computer system for network configuration data associated with network components within the host computer system, wherein to query the host computer system the processing device to query an application container of the host computer system for the network configuration data of one or more of the network components within the application container;
    receiving, in response to the querying, the network configuration data comprising first configuration data of the network components within the host computer system and second configuration data of connectivity between the network components within the host computer system, wherein at least one of the network components is represented by a virtual network component within the application container of the host computer system; and
    generate, in view of the network configuration data, a network configuration model of the network components within the host computer system, wherein the network components within the host computer system are represented by nodes of a graph and the connectivity is represented by edges of the graph, wherein the virtual network component within the application container is represented by a respective node of the network configuration model, and wherein the network configuration model logically groups the one or more of the network components that are within the application container.

12. The system of claim 11, wherein to query the host computer system for network the configuration data associated with network components within the host computer system, the processing device further to:

query at least one of a host operating system (OS), a guest OS, or a hypervisor for the network configuration data for the virtual network component within the application container.

13. The system of claim 11, the processing device further to:

cause a graphical representation of the network configuration model to be displayed on a user device.

14. The system of claim 11, wherein to query the host computer system for the network configuration data associated with the network components within the host computer system, the processing device further to:

receive an identifier of the application container operating on the host computer system;

query the host computer system for the first configuration data of the network components within the application container; and query the host computer system for the second configuration data of the connectivity between the network components within the application container.

15. The system of claim 11, wherein the virtual network component is provided by one of a virtual network interface card (vNIC) associated with the application container or a virtual network segment associated with the vNIC.

16. A non-transitory computer readable storage medium, having instructions stored therein, which when executed, cause a processing device to:

query, by the processing device, a host computer system for network configuration data associated with network components within the host computer system, wherein to query the host computer system the processing device to query an application container of the host computer system for the network configuration data of one or more of the network components within the application container;

receiving, in response to the querying, the network configuration data comprising first configuration data of the network components within the host computer system and second configuration data of connectivity between the network components within the host computer system, wherein at least one of the network components is represented by a virtual network component within the application container of the host computer system; and generate, in view of the network configuration data, a network configuration model of the network components within the host computer system, wherein the network components within the host computer system are represented by nodes of a graph and the connectivity is represented by edges of the graph, wherein the virtual network component within the application container is represented by a respective node of the network configuration model, and wherein the network configuration model logically groups the one or more of the network components that are within the application container.

17. The non-transitory computer readable storage medium of claim 16, wherein to query the host computer system for network the configuration data, the processing device further to:

query at least one of a host operating system (OS), a guest OS, or a hypervisor for the network configuration data for the virtual network component within the application container.

18. The non-transitory computer readable storage medium of claim 16, the processing device further to:

cause a graphical representation of the network configuration model to be displayed on a user device.

19. The non-transitory computer readable storage medium of claim 16, wherein to query the host computer system for the network configuration data, the processing device further to:

receive an identifier of the application container operating on the host computer system;

query the host computer system for the first configuration data of the network components within the application container; and query the host computer system for the second configuration data of the connectivity between the network components within the application container.

20. The non-transitory computer readable storage medium of claim 16, wherein the virtual network component is provided by one of a virtual network interface card (vNIC) associated with the application container or a virtual network segment associated with the vNIC.

* * * * *